United States Patent
Moran

(10) Patent No.: US 11,130,288 B2
(45) Date of Patent: Sep. 28, 2021

(54) DUAL WAVELENGTH NEGATIVE IMAGING DLP-SLA SYSTEM

(71) Applicant: Lawrence Livermore National Security, LLC, Livermore, CA (US)

(72) Inventor: Bryan D. Moran, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 253 days.

(21) Appl. No.: 16/020,529

(22) Filed: Jun. 27, 2018

(65) Prior Publication Data
US 2020/0001531 A1 Jan. 2, 2020

(51) Int. Cl.
| | |
|---|---|
| *B29C 64/268* | (2017.01) |
| *B29C 64/277* | (2017.01) |
| *B29C 64/393* | (2017.01) |
| *B33Y 50/02* | (2015.01) |
| *B33Y 30/00* | (2015.01) |

(52) U.S. Cl.
CPC .......... *B29C 64/268* (2017.08); *B29C 64/277* (2017.08); *B29C 64/393* (2017.08); *B33Y 30/00* (2014.12); *B33Y 50/02* (2014.12)

(58) Field of Classification Search
CPC ............................ B29C 64/277; B29C 64/282
See application file for complete search history.

(56) References Cited

U.S. PATENT DOCUMENTS

| | | | |
|---|---|---|---|
| 4,575,330 A | 3/1986 | Hull | |
| 6,193,393 B1 * | 2/2001 | Dove | G02B 27/141 362/19 |
| 2005/0259785 A1 * | 11/2005 | Zhang | G03F 7/0037 378/34 |

(Continued)

FOREIGN PATENT DOCUMENTS

FR     2 567 668 A1    1/1986

OTHER PUBLICATIONS

Gibson et al. History of Stereolithography. Stereolithography: Materials, Processes, and Applications. (2011): 41-43. Print. Oct. 7, 2015.
"The Ultimate Guide to Stereolithography (SLA) 3D Printing". Formlabs. Formlabs, Inc. Retrieved Dec. 26, 2017, 38 pages.
Moussion. Interview d'Alain Le Méhaute, l'un des pères de l'impression 3D. (2014) Primante 3D, 9 pages.
Mendoza, Alain Le Mehaute. The Man Who Submitted Patent for SLA 3D Printing Before Chuck Hull. (May 15, 2015) 3dprint.com. 3DR Holdings, LLC., 14 pages.

(Continued)

*Primary Examiner* — Alex A Rolland
(74) *Attorney, Agent, or Firm* — Harness, Dickey & Pierce, P.L.C.

(57) ABSTRACT

The present disclosure relates to a digital light projector (DLP) system which has first and second light sources. The first optical source may generate a first beam at a first wavelength which causes polymerization of a photopolymerizable resist. The second optical source may generate a second beam at a second wavelength different from the first wavelength, and where the second beam inhibits polymerization of the photopolymerizable resist. A digital micromirror device (DMD) is included which has a plurality of micromirrors and is configured to be illuminated by the first and second beams and to generate a pattern on the micromirrors which has light from the first and second light wavelengths controlled by the micromirror position. The first light image causes polymerization of a first portion of the photopolymerizable resist, while the second image inhibits polymerization of a second portion of the photopolymerizable resist.

14 Claims, 6 Drawing Sheets

(56) References Cited

U.S. PATENT DOCUMENTS

2016/0067921 A1* 3/2016 Willis ............... B29C 64/135
264/401
2017/0113406 A1* 4/2017 Chen ................ B29C 64/129

OTHER PUBLICATIONS

"Stereolithography / 3D Printing / Additive Fabrication". Photopolymers. Savla Associates. Retrieved Aug. 10, 2017, 4 pages.
Hull. On Stereolithography. Virtual and Physical Prototyping. (2012) 7 (3): 177. doi:10.1080/17452759.2012.723409. Retrieved Oct. 11, 2015, 2 pages.
"Our Story". 3D Systems. 3D Systems, Inc. Retrieved Aug. 10, 2017, 17 pages.
Jacobs. Introduction to Rapid Prototyping and Manufacturing. Rapid Prototyping and Manufacturing: Fundamentals of Stereolithography. 1st Ed. (1992): 4-6. Print. Oct. 7, 2015, 29 pages.
Asberg et al. Feasibility of design in stereolithography, Algorithmica, Special Issue on Computational Geometry in Manufacturing, vol. 19, No. 1/2, Sep./Oct. 1997, pp. 61-83.
Crivello et al. Photopolymer Materials and Processes for Advanced Technologies. Chemistry of Materials Chem. Mater. 26.1 (2014), pp. 533-548.
Lipson et al., 3-D Printing the History of Mechanisms. Journal of Mechanical Design J. Mech. Des. (2004): pp. 1029-033.
Fouassier, J. P. Photopolymerization Reactions. The Wiley Database of Polymer Properties 3 (2003) 31 pages.
NGO, Formlabs Form 2 3D Printer review: An excellent 3D printer for a hefty price. Cnet. Retrieved Aug. 3, 2016, 18 pages.
Klimek et al., Sterolithographic modelling for reconstructive head surgery. Acta Oto-Rhino-Laryngologica Belgica (1993). 47 (3), pp. 329-334.
Bouyssie et al., Stereolithographic models derived from x-ray computed tomography. Reproduction accuracy. Surgical & Radiologic Anatomy. (1997). 19 (3), pp. 193-199.
Bibb et al., A Review of the Issues Surrounding Three-Dimensional Computed Tomorgraphy for Medical Modelling using Rapid Prototyping Techniques. Radiography. (2009) 16, pp. 78-83. doi:10.1016/j.radi.2009.10.005.
Winder et al., Medical Rapid Prototyping Technologies: State of the Art and Current Limitations for Application in Oral and Maxillofacial Surgery. Journal of Oral and Maxillofacial Surgery.(2005). 63 (7), pp. 1006-1015. doi:10.1016/j.joms.2005.03.016.
Palermo, What is Stereolithography? Live Science. Purch Group. (Jul. 16, 2013), 2 pages. https://www.livescience.com/38190-sterolithography.html.
Brain, How Stereolithography 3-D Layering Works. Howstuffworks. Infospace LLC. Retrieved Dec. 11, 2015, 2 pages.
Ngo, XYZprinting Nobel 1.0 3D Printer review: Highly detailed prints at a high cost. CNET. Retrieved Aug. 3, 2016.
Gu et al., Super-resolution nanolithography in photoreduction polymers, IQEC/CLEO Pacific Rim 2011, Sep. 1, 2011, Sydney, Australia, 2 pages.
Hu et al., Two-Wavelength, Photo-Initiation and Photo-Inhibition Competing for Selective Photo-Patterning of Hydrogel Porous Microstructures, International Journal of Precision Engineering and Manufacturing vol. 19, No. 5, May 2018, pp. 729-735.
Cao et al., New photoresists for super-resolution photo-inhibition nanofabrication, IQEC/CLEO Pacific Rim 2011, Sep. 1, 2011, Sydney, Australia, 2 pages.
Gan et al., Dynamic modeling of superresolution photoinduced-inhibition nanolithography, Optics Express, Optical Society of America, 16879, vol. 20, No. 15, Jul. 16, 2012.
Beer et al., Rapid, continuous additive manufacturing by volumetric polymerization inhibition patterning, Science Advances, American Association for the Advancement of Science, Sci. Adv. 2019;5:eaau8723, Jan. 11, 2019, 9 pages. http://advances.sciencemag.org/ on Jan. 28, 2019.
McLeod et al., Two-color photo-initiation/inhibition lithography, Proceedings of SPIE 7591, Advanced Fabrication Technologies for Micro/Nano Optics and Photonics III, 759102, Feb. 16, 2010. https://www.spiedigitallibrary.org/conference-proceedings-of-spie on Jan. 24, 2019.

* cited by examiner

DUAL WAVELENGTH NEGATIVE IMAGING DLP-SLA SYSTEM

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to 3D printing systems, and more particularly to a digital light projector stereolithographic apparatus (DLP-SLA) 3D printing system that which creates simultaneous negative optical images of two separate wavelength bands to produce components from a photopolymerizable resist which have significantly improved feature resolution as compared to state of the art single wavelength band DLP-SLA.

BACKGROUND

This section provides background information related to the present disclosure which is not necessarily prior art.

Controlling and limiting the polymerized area for stereolithography is a fundamental goal since its development in the 1980s. Microstereolithography's purpose is to make features on very small scales, where controlling the features within the polymerized area is even more difficult and is the limiting issue for many systems and techniques. A Dual Wavelength Negative Imaging DLP-SLA uses ordinary incoherent light sources and a single digital micromirror device ("DMD") to make well defined sharp features below the diffraction limit, which is normally the smallest feature size possible for lithography systems.

A stereolithographic apparatus ("SLA") uses vat photopolymerization to polymerize light activated resins, in a layer wise fashion, to build up a solid 3D object. The wavelengths of light used typically induce free radical generation that initiates a polymerization reaction. The current state of SLA based 3D printing systems use either lasers with galvanometer mirrors that "write" serially (the laser is a single point that must traverse every point to cause polymerization) in the resin vat, or spatial light modulators, typically digital light projector ("DLP") or Liquid Crystal on Silicon ("LCoS"). The DLP or LCoS may be imaged onto the resin vat to produce, in a parallel fashion, (the DMD image has effectively many thousands or even millions of points at the same time, thus parallel) the additively manufactured parts.

SLA produces some of the highest detailed AM parts currently being produced. Thus, there is continuing interest in making smaller features, and making even more detailed parts using SLA.

One of the limits currently is the unavoidable growth of polymerized features due to diffusion of the free radicals through the liquid resin. Even an infinitely sharp projected image of complete darkness next to full illumination (which is impossible due to the diffraction limit of light) would have a "growth" into the dark region due to diffusion of the free radicals over the time scales that they exist. Also, there exists, even in the best case, a diffraction limited Gaussian drop in light intensity for any projected image edge. These two effects make the polymerized edge both grow into the dark region and have a gradient in polymerized "solidity" from "fully polymerized" to a soft gel. Further the polymerizing free radicals are typically extinguished by reaction with oxygen, preventing the polymerization from propagating out into the dark areas. For small openings, grooves, holes, or any small area below a critical threshold, there is a compounding effect of consuming "all the oxygen" in the region. This causes the oxygen depleted area to polymerize, making small holes or narrow openings very difficult to produce once below a certain feature size.

Still another undesirable effect from SLA printing is the undercut or "scalloping" seen in the layers produced through SLA. The edge of a layer normally exhibits this undercut due to light being absorbed and losing intensity while propagating through the resin. As such the density of photoinitiated free radicals is likewise lowered with no corresponding drop in oxygen molecules that terminate the polymerization reaction. Therefore, as the light goes deeper, its photoinitiator free radicals are consumed at a faster rate, thus giving rise to undercut.

The paper "*Two-Color Single-Photon Photoinitiation and Photoinhibition for Subdiffraction Photolithography*", Timothy F. Scott, Benjamin A. Kowalski, Amy C. Sullivan, Christopher N. Bowman, Robert R. McLeod, published in Science 15 May 2009: Vol. 324, Issue 5929, pp. 913-917 DOI: 10.1126/science.1167610 (hereinafter "Scott et al."), demonstrated an approach to solving the above described polymerization limitation using two lasers. Scott et al. demonstrate a highly sub-diffraction limited spot size approaching sizes achievable only with Two Photon techniques with a 200 nm "wire" being produced. Scott et al. makes use of a "polymerization laser" which generates photoinitiator radicals centered in the hole of a donut mode of an "inhibiting laser", where the inhibiting laser is generating photoinhibitor radicals. The effect is that the photoinitiators and photoinhibitors interact with each other, and the result is that the area polymerized is confined to a size much smaller than what the polymerizing laser can normally produce (the best case normally being somewhat larger than the diffraction limit). As the Photoinhibitor can be generated at will and in an adjustable amount, via light intensity, the effect is adjustable. Generally, the polymerization rate (Rp) is proportional to the square root of the initiation rate Rin. With the initiation rate scaling linearly with the intensity Rin~Iblue. Therefore, the rate of polymerization is approximately Rp~Iblue$^{0.5}$. In the presence of the inhibiting radicals, the polymerization rate is modified, Rp~(Iblue−ß*IUV)$^{0.5}$ where Iblue is the intensity of the polymerizing blue light, IUV is the inhibiting UV light and ß is a constant. Therefore, generally speaking, subtracting the UV light profile from the blue light profile is what defines the edge profile, not the diffraction limit of the polymerizing light. In this way, defined features are not limited to the diffraction limit. Further the inhibition zone of the UV light can be increased by increasing its relative intensity as compared to the polymerizing wavelength.

The assignee of the present disclosure is a leader in the innovation and development of AM systems. The systems used at LLNL include DLP imaging-based systems that have several advantages over laser-based AM systems. These advantages can be summed up by describing laser-based SLA as performing writing serially, where DLP imaging-based systems perform writing in parallel. A laser must be scanned as a single writing point to produce features, which in the case of highly detailed parts can take considerable time. However, an image produced by a DLP imaging-based system has all the information of the entire field projected at one time, so it can be processed faster with even better resolution.

However, heretofore there has been no easy way, from a technical standpoint, to project two wavelengths simultaneously. Normally, multiple wavelengths are used for projectors such as movies. Images are achieved by various methods, for example either by time multiplexing though a color wheel and a broad wavelength source, or by combining several individual DMD devices together to make a single, full color image. All these methods involve some significant additional complexity and require various degrees of precision alignment and synchronization.

Accordingly, the various known technologies for additive manufacturing are still deficient is being able to reliably create parts with open spaces, such as small holes, grooves and channels. Such capability would enable many more useful structures to be produced which are currently difficult, or simply impossible, to produce, such as small vias, microfluidic channels, closely spaced plates for batteries or capacitors.

SUMMARY

This section provides a general summary of the disclosure, and is not a comprehensive disclosure of its full scope or all of its features.

In one aspect the present disclosure relates to a digital light projector (DLP) system. The system may comprise a first light source for generating a first beam at a first wavelength. The first beam is operable to cause polymerization of a photopolymerizable resist. A second light source may be included for generating a second beam at a second wavelength different from the first wavelength. The second beam is operative to inhibit polymerization of the photopolymerizable resist. A digital micro mirror device (DMD) may be included which has a plurality of micromirrors and is configured to receive the first and second beams and to generate therefrom first and second light patterns. The first light pattern, when falling on the photopolymerizable resist, creates a first image made up of light of the first wavelength, and the second light pattern, when falling on the photopolymerizable resist, creates a second image made up of light of the second wavelength. The two images are interleaved. The first wavelength light causes polymerization of a first portion of the photopolymerizable resist, while the second wavelength light inhibits polymerization of a second portion of the photopolymerizable resist.

In another aspect the present disclosure relates to a three dimensional (3D) printing system for forming a structure from a photopolymer resin. The system may comprise a first light source for generating a first beam at one of a first wavelength or a first wavelength range, the first beam operable to cause polymerization of a photopolymerizable resist. A second light source may be included for generating a second beam at one of a second wavelength or a second wavelength range, different from the first wavelength or first wavelength range, and where the second beam is operative to inhibit polymerization of the photopolymerizable resist. A digital micro mirror device (DMD) may be included which has a plurality of micromirrors, each of the micromirrors being tiltable between first and second tilt positions, and each being configured to simultaneously be illuminated by the first and second beams. The micromirrors of the DMD then act as switches between either beam for each micromirror, the DMD, then when imaged, effectively creates first and second light patterns using both of the first and second beams, and overlays the first and second light patterns on one another to create interleaved first and second images on the photopolymer resist, respectively, where light from the first image is made up of the first wavelength and causes polymerization of the photopolymerizable resist, while the light from the second image is made up of the second wavelength and inhibits polymerization of the photopolymerizable resist, and where the first and second images created on the photopolymer resist using the first and second images are negative images of one another.

In still another aspect the present disclosure relates to a method for forming a three dimensional (3D) component from a photopolymer resin. The method may comprise generating a first optical beam at a first wavelength, the first optical beam causing polymerization of a photopolymerizable resist. The method may further include generating a second optical beam at a second wavelength different from the first wavelength, and where the second optical beam is operative to inhibit polymerization of the photopolymerizable resist. The method may further include using a digital micro mirror device (DMD) having a plurality of micromirrors to receive the first and second beams and to generate therefrom corresponding first and second light patterns, respectively. The first light pattern forms a first image on the photopolymerizable resist to cause polymerization of a first portion of the photopolymerizable resist, while the second light pattern forms a second image on the photopolymerizable resist and inhibits polymerization of a second portion of the photopolymerizable resist.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

Figure 4:
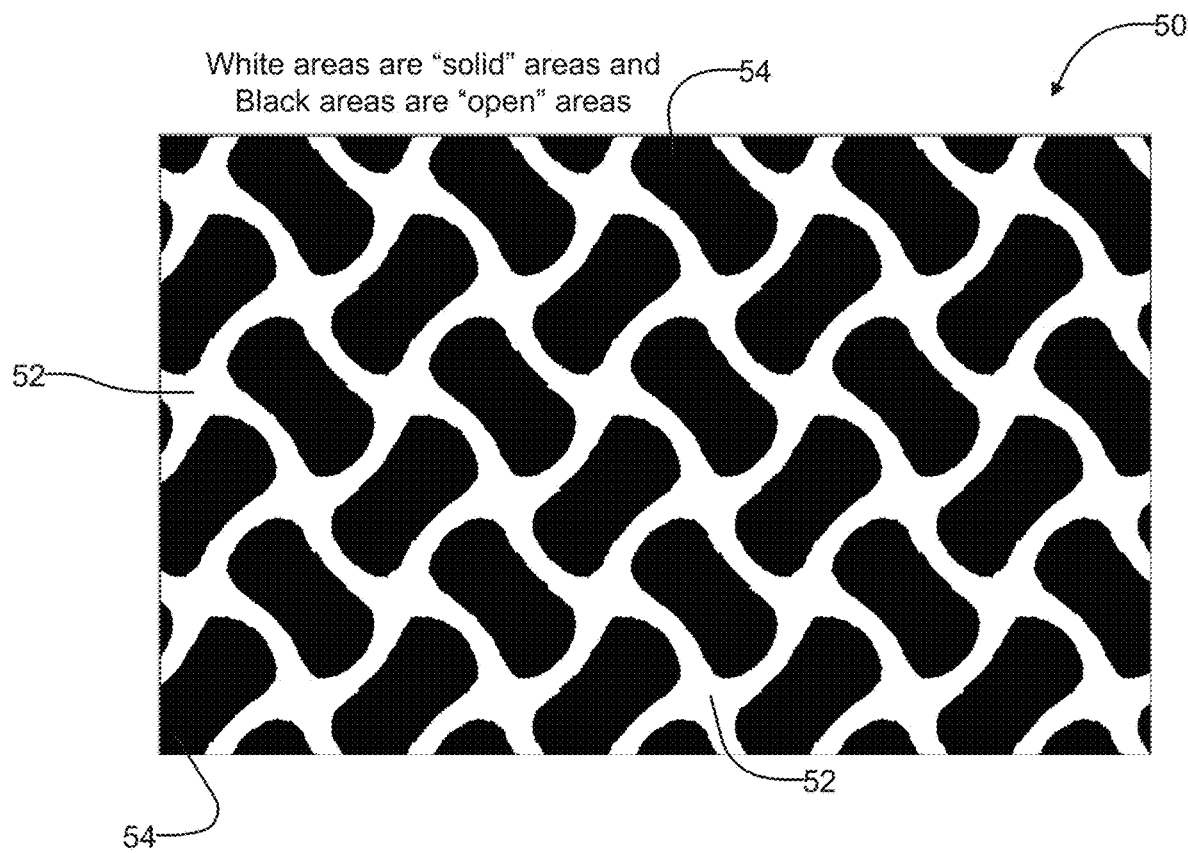
FIG. 4 shows a simplified simulation of a slice (i.e., layer) of a 3D object to be printed where the white areas are areas to be printed and the black areas are "open" areas, which are not to be printed.
Figure 7:
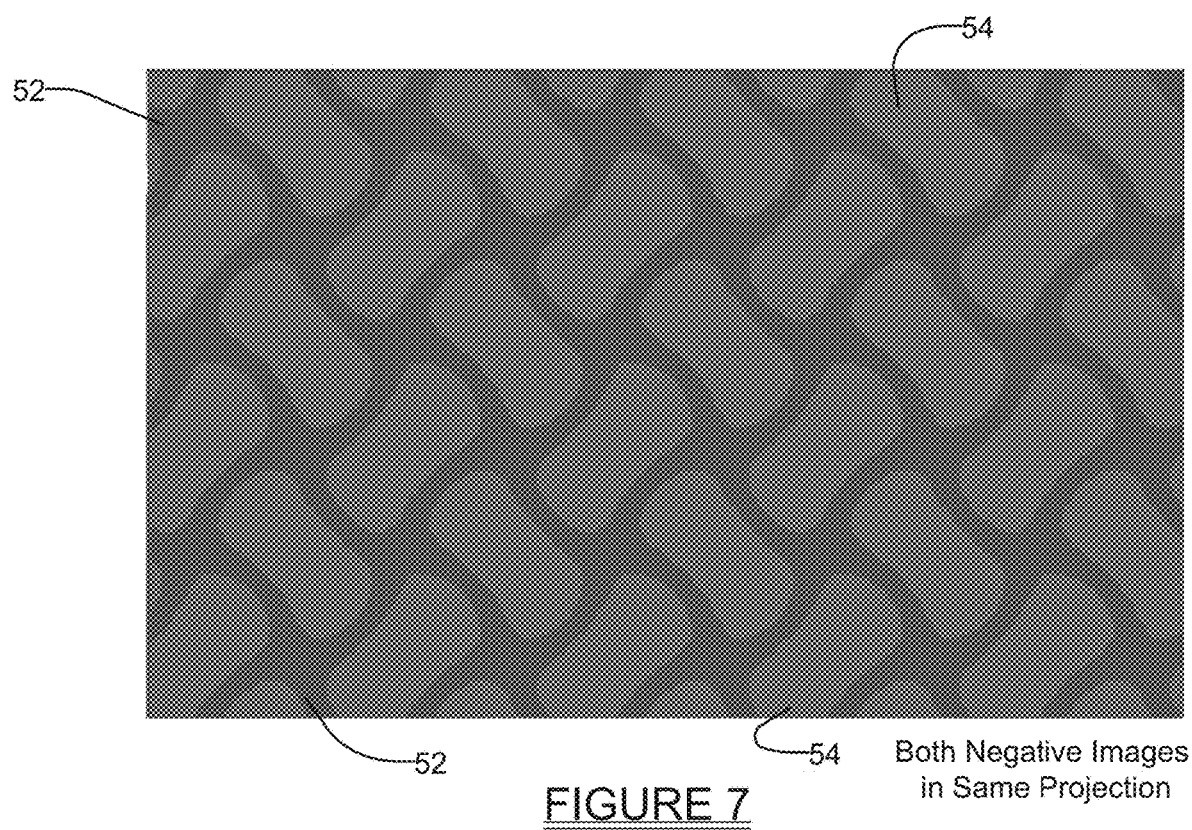
Figure 8:
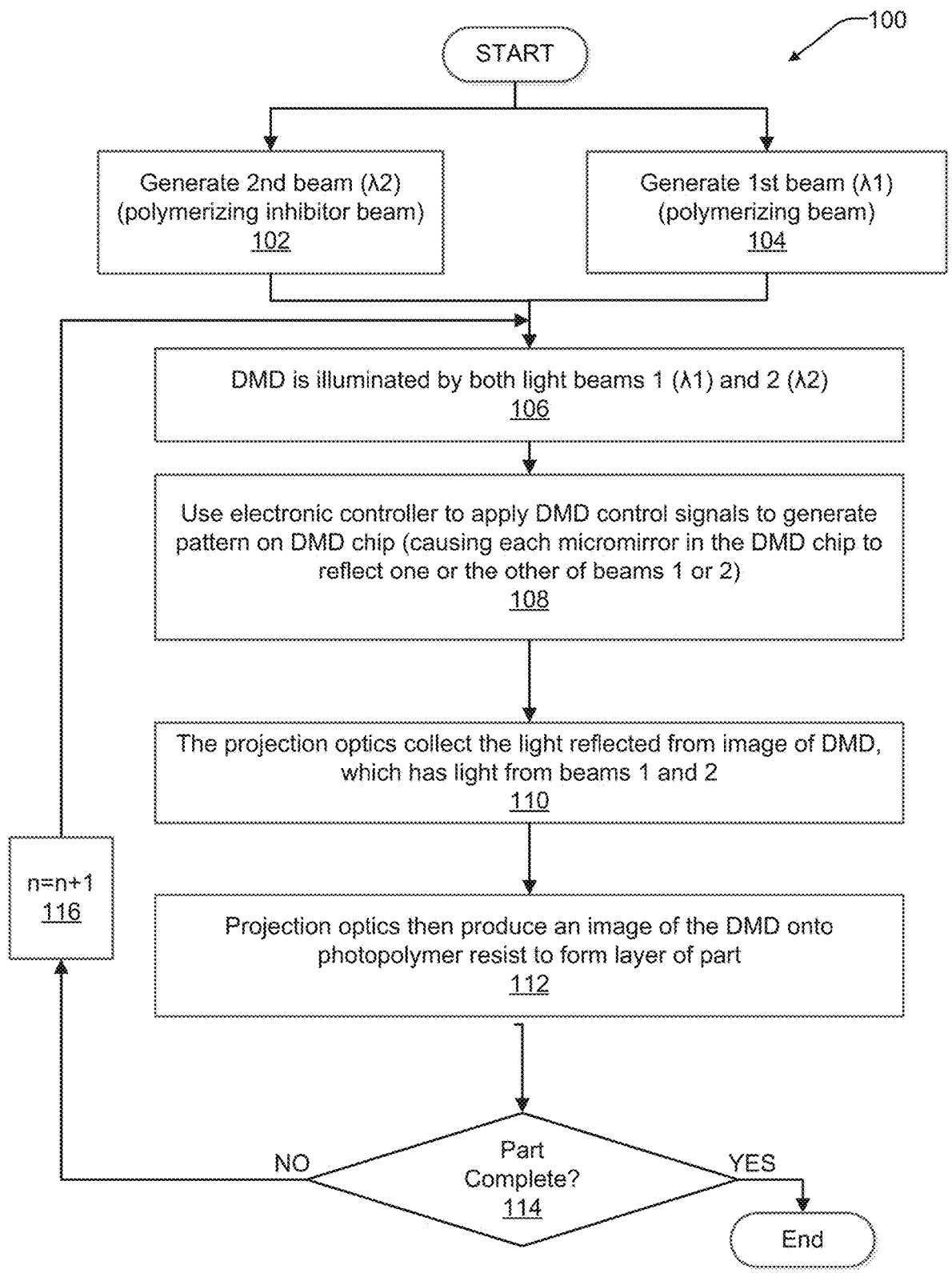

FIG. 7 shows both beams (polymerizing initiator ($\lambda 1$) and polymerizing inhibitor ($\lambda 2$)) being used to illuminate the white and black areas, respectively, from FIG. 4; and FIG. 8 is a high level flowchart summarizing various operations that a method of the present disclosure may perform in generating and simultaneously projecting mirror negative images to both initiate and inhibit polymerization of different portions of a photopolymerizable resist.

Corresponding reference numerals indicate corresponding parts throughout the several views of the drawings.

DETAILED DESCRIPTION

Example embodiments will now be described more fully with reference to the accompanying drawings. The references to lasers, light bundles, beam paths, and wavelengths refer to the same general thing in the described system, that being the light manipulated through and by the device.

The present disclosure addresses the above-described challenges through a Dual Wavelength Negative Imaging DLP-SLA using a single DMD with a second beam path which makes the wavelengths synchronous, interleaved, and automatic negative images of each other. The time scales for the free radical diffusion lengths are fast, for example, on the scale of 1 m/s, so radicals would take 1 ps to travel 1 μm. In controlling features to 1 um, inhibitor radicals that enable photopolymerization are produced from the first wavelength beam, and initiator radicals that prevent photopolymerization are produced from the second wavelength beam. Both beams are present over these short time scales, (i.e., simultaneously present), otherwise unwanted diffusion may occur over these very small distances. Such a condition may produce some feature blurring if the inhibition radicals were not present when the initiation radicals were generated. So, for optimally forming micro sized features, it is desirable to have both wavelength beams present.

The approach of the present disclosure is unique in additive manufacturing and ideal for the chemistry of photoinitiator and photoinhibitor dynamics, which leads to the ability to create less than diffraction limited polymerized structures. The diffraction limit is a constraint for all forms of photolithography and is a fundamental property for any light-based system. The ability to make structures smaller than the diffraction limit with these ordinary DMDs, LEDs, and optics with the teachings of the present disclosure is unique and enabling. Likewise, other problems with SLA printing may be addressed.

Figure 1:
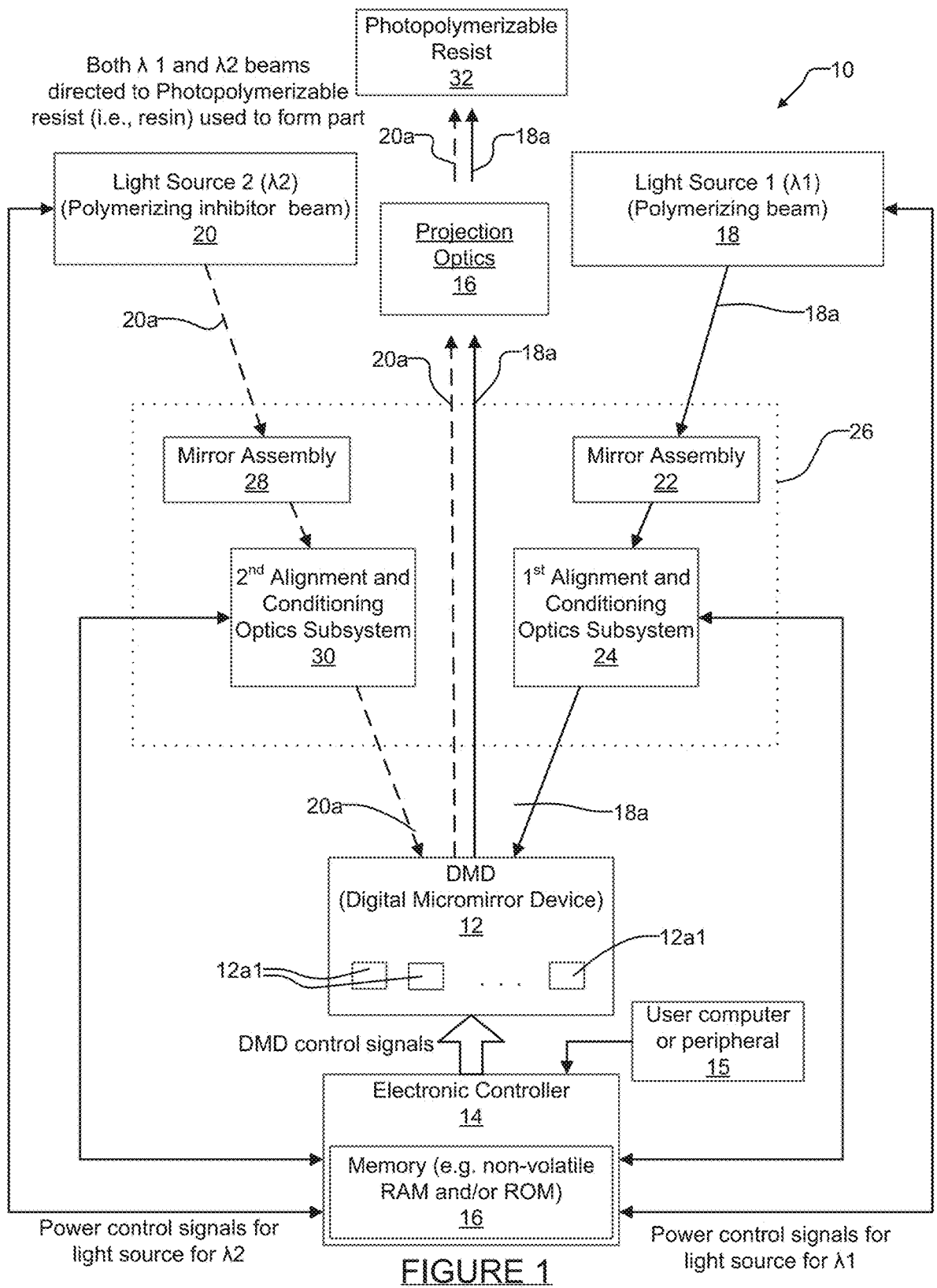
FIG. 1 is a high level block diagram of one embodiment of a system in accordance with the present disclosure.

One embodiment of a dual wavelength, negative imaging DLP-SLA system 10 (hereinafter simply "system 10") is shown in FIG. 1. The system 10 may include a DMD 12 and an electronic controller 14 for generating DMD control signals which are applied independently to each of one of a plurality of micromirrors that make up the DMD 12. The electronic controller 14 may include a non-volatile memory (e.g., RAM and/or ROM) 16 for storing information or data used to help form a part from a photopolymerizable resist (i.e., resin, not shown).

The electronic controller 14 applies light intensity control signals simultaneously to a first light source 18, which may be, for example, a first LED or a first laser, and to a second light source 20, which may be, for example, a second LED or a second laser. The first light source 18 may produce a first optical beam 18*a* (hereinafter simply "first beam" 18*a*) having a first wavelength (e.g., λ1) (or optionally within a first wavelength range) selected to initiate photopolymerization of a photopolymerizable resist being used to form a part. The first wavelength (λ1) may vary, but in one example it may be 473 nm. The second light source 20 may produce a second optical beam 20*a* (hereinafter simply "second beam" 20*a*) having a second wavelength (λ2) (or within a second wavelength range), for example in the UV spectrum, which is selected to inhibit polymerization. The second wavelength (λ2) of the second optical beam 20*a* may also vary, but in one example it may be 365 nm.

The first beam 18*a* may be focused and conditioned by passing it through a first mirror assembly 22 and a first alignment and conditioning optics subsystem 24, before the first beam 18*a* is ultimately directed upon DMD 12. Similarly, the second beam 20*a* may be directed through a second mirror assembly 28 and a second alignment and conditioning optics subsystem 30, before being directed upon DMD 12. In practice, the components 22, 24, 26 and 28 may be part of a single system 26 to drive the beams 18*a* and 20*a* to the DMD 12. The DMD 12 reflects both beams 18*a* and 18*b* simultaneously to the projection optics 16. The projection optics image both of the beams 18*a* and 18*b* at a photopolymerizable resist 32 (i.e., a photopolymerizable build plane) being used to form the part.

A principal advantage and feature of the system 10 is that the two beams 18*a* and 20*a* are negatives of one another. Put differently, the image of the DMD 12 is made up of a large plurality of individual micromirrors 12*a*. Due to the unique arrangement of the incoming beams 18*a* and 20*a* onto the DMD 12, each of the micromirrors 12*a* will have the light either from the first light source 18 or from the second light source 20. As will be described further in the following paragraphs, the toggling action of the micromirror 12*a* will have the effect of changing which beam path is reflected from any one micromirror 12*a*. Therefore, the pattern projected will have one of the two wavelengths on each individual micromirror 12*a*. As such the two wavelengths will be interleaved and, with the projection optics 16, then be sharply imaged at the photopolymerizable resist build plane. This is further explained with reference to FIG. 2 which shows the system 10 in a more simplified form to illustrate how the two light sources 18 and 20 are being used together with the control of the micromirrors 12*a* in the DMD 12 to create the two "mutually negative" images from the beams 18*a* and 20*a*.

Figure 2:
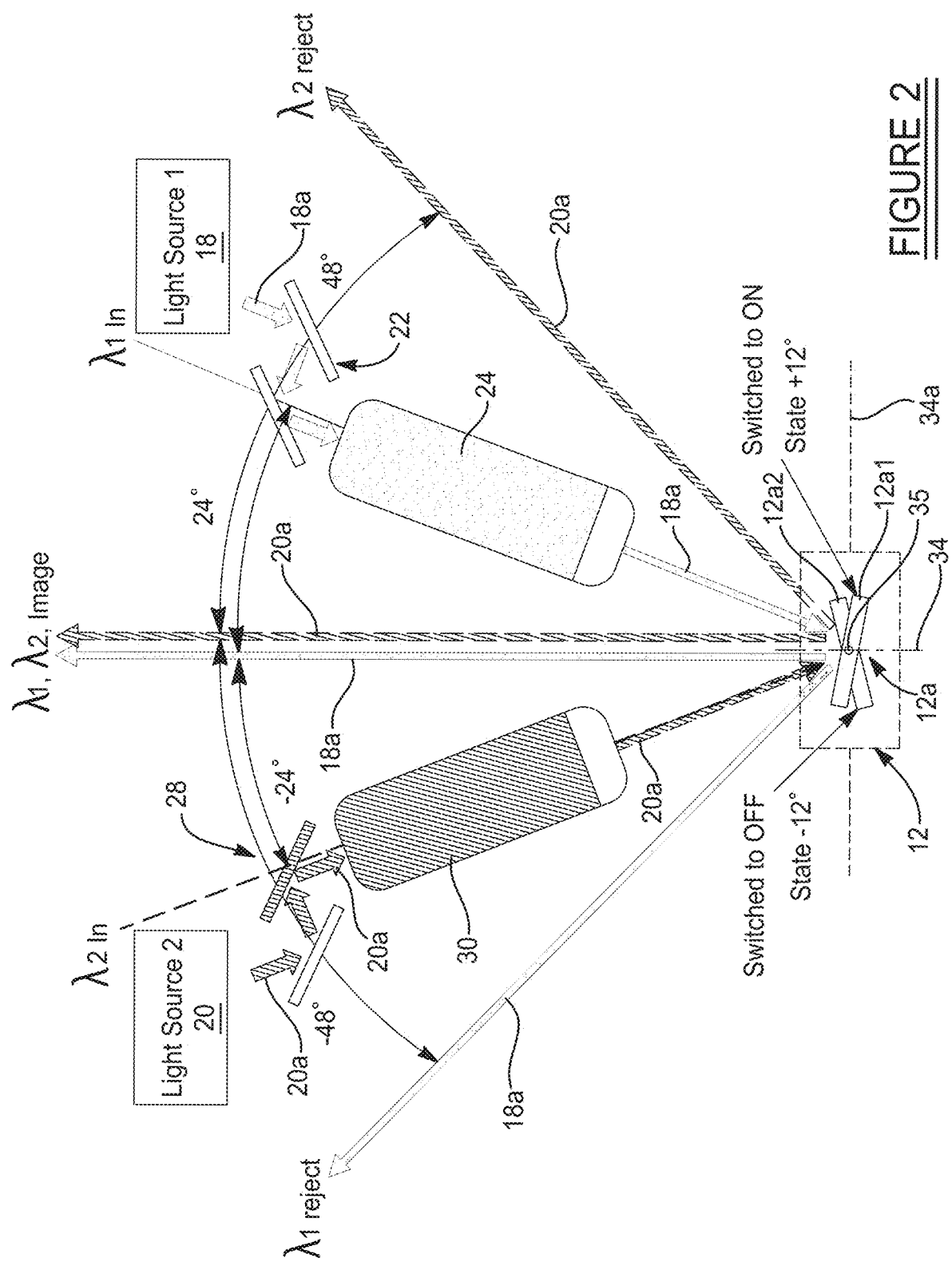
FIG. 2 is a simplified diagram showing a polymerizing beam-path and a polymerization inhibiting beam-path simultaneously illuminating a DMD chip, and each micromirror can be controlled (i.e., tilted) to reflect either the first beam or the second beam therefrom toward the projection optics (but not both simultaneously)

The DMD 12 forms a spatial light modulator which represents the enabling technology for DLP projection. The DMD 12 may include an array of the micromirrors 12*a*, which are small MEMS (microelectromechanical system) micromirrors, one of which is shown in FIG. 2. Each micromirror 12*a* may be, for example, on the scale of 10 μm, and typically is square in shape (e.g., 10 μm×10 μm). Each micromirror 12*a* making up the DMD 12 operates by toggling (i.e., tilting) relative to a surface normal reference plane, which is shown as plane 34 in FIG. 2. Plane 34 is normal to a DMD chip face surface 34*a*. The toggling is done in response to the DMD 12 control signals from the electronic controller 14, and causes the micromirror 12*a* to tilt by ±12°, from the surface normal reference plane 34. FIG. 2 shows one micromirror 12*a* in both its +12° orientation 12*a*1, as well as in its −12° orientation 12*a*2. This is also shown in simplified FIG. 3. This action occurs with every micromirror 12*a* of the DMD 12, and each micromirror is independently, digitally controlled using the DMD control signals from the electronic controller 14.

Figure 3:
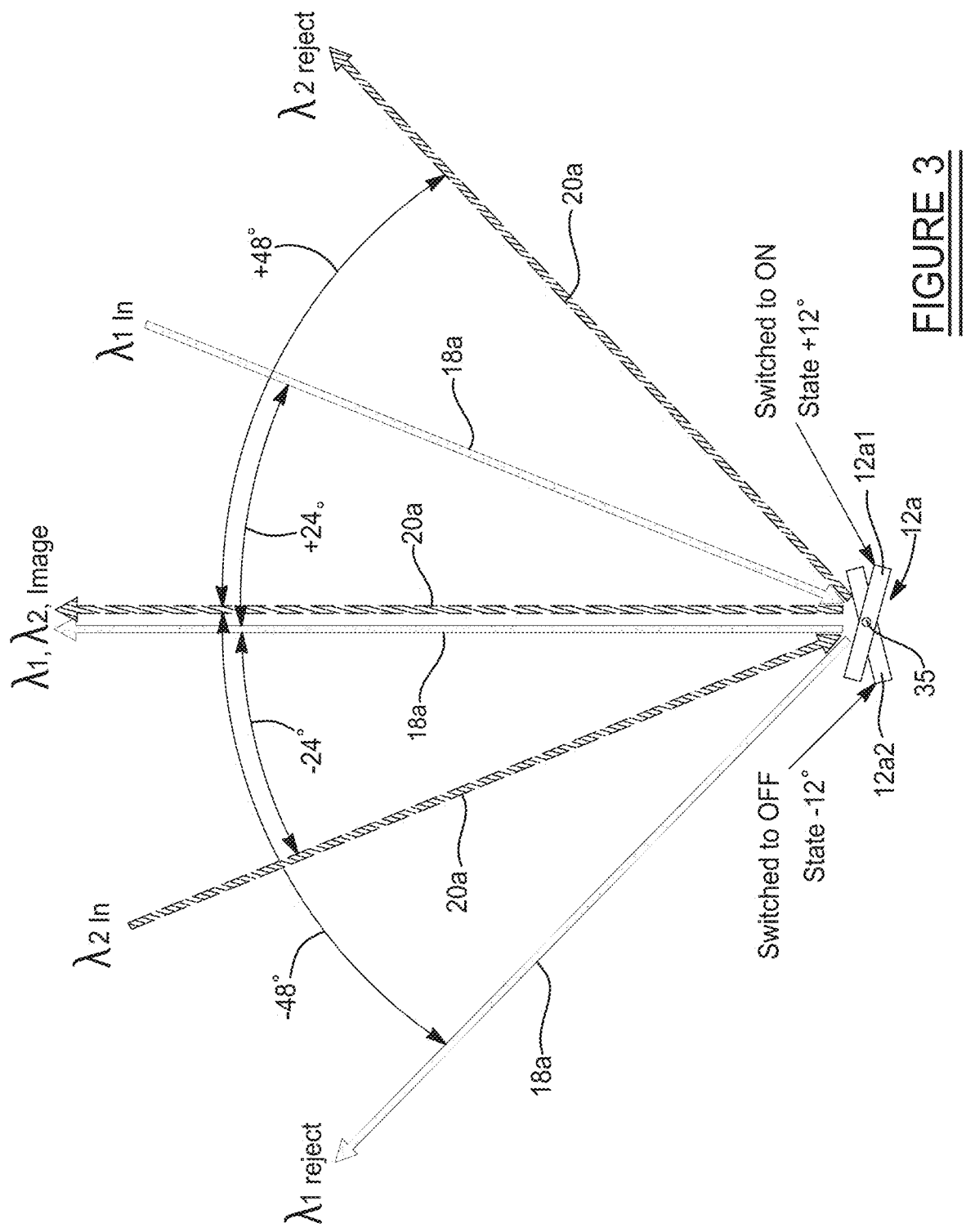
FIG. 3 shows another simplified diagram further illustrating the angular orientations of the two beams shown in FIG. 2 but without other various components of the system present in the drawing.

In the example shown in FIGS. 2 and 3, the DMD 12 is designed to be used with the incoming "light bundle" formed by the two beams 18*a* and 20*a* illuminating the DMD 12, each light beam 18*a* and 20*a* being at an angle of 24° from the normal reference plane 34, and on opposite sides of the normal plane 34 (i.e., in this example +24° and −24° offset). The two beams 18*a* and 18*b* are preferably also further aligned to be perpendicular to the tilt axis 35 angle of the micromirror 12a (which would be coming out of the page in the illustrations of FIGS. 2 and 3). In the "ON" state, the micromirror 12a is toggled to +12°, as indicated by reference number 12a1. In the ON state, the incoming first light beam 18a reflects off the micromirror 12a to an angle of +12° (i.e., light reflects off of any surface at twice surface normal to that surface) relative to the surface normal reference plane 34, and exits the DMD 12 aligned to the DMD chip surface normal reference plane 34 (i.e., at 0°), after which the light beam 18a then enters the projection optics 16. In the "OFF" state, the micromirror 12a is toggled to −12°, the micromirror 12a thus has a total tilt change of −24 and the first beam 18a reflects form the micromirror 12a at an angle of +48° (labelled $\lambda_{1reject}$ in FIG. 2) relative to the surface normal reference plane 34, and out from the system 10 to a beam dump (not shown).

The system 10 also projects the second beam 20a (having wavelength ($\lambda$2)) at incoming angle at −24° degrees to the DMD surface normal reference plane 34, and perpendicular to the tilt axis of the DMD 12. The second beam 20a is projected from the opposite side and direction as the first beam 18a. Thus, when the micromirror 12a is in the ON state, the second beam 20a is reflected at an angle of 48° relative to the surface normal plane 34 (labelled as $\lambda_{2reject}$ in FIG. 2), and out from the system 10 to a beam dump (not shown). When the micromirror 12a is in the OFF state, the second beam 20a is reflected at an angle of 24°, which is parallel (i.e., at 0°) to the surface normal reference plane 34 and toward the projection optics 16. Essentially, all the same reflections take place as described for the first beam 18a but in the opposite direction and effect. Thus, when the first micromirror 12a is in the ON position for the first beam 18a, it will be always be in the OFF state for the second beam 20a. Conversely, when the micromirror 12a is in the OFF state relative to the first beam 18a, it will always be in the ON state for the second beam 20a. Due to this effect, normal operation of any micromirror 12a on the DMD 12 has the effect of switching which beam 18a or 20a is reflected from the DMD for that individual micromirror. Therefore, the reflected light from the DMD 12, when imaged, produces an image of the DMD with each micromirror 12a of the DMD (i.e., the DMD chip) filled with light from one or the other beam 18a or 20a. It cannot be light from both beam-paths, nor can it be light from neither beam-path, it can only be one or the other (i.e., light from beam 18a or light from beam 20a). In this manner an image of the DMD 12 is a spatially resolved, interleaved image of each beam 18a and 20a, the pattern of which is determined by the DMD micromirrors 12a. Therefore, the system 10 simultaneously projects the two wavelengths $\lambda$1 and $\lambda$2 using the two beams 18a (from which it creates a first image on the photopolymerizable resist) and 20a (from which it creates a second image on the photopolymerizable resist), and as such the first and second images are "negatives" of each other, with respect to the wavelengths in beam-path one and beam-path two, and the two images may also be said to be interleaved. Thus, the resulting image on the photopolymerizable resist from the DMD 12 (being illuminated as described with the two beams 18a and 20a having wavelengths $\lambda$1 and $\lambda$2) will be inversely or negatively imaged with respect to each other, meaning that the normally dark space for the first beam 18a having wavelength $\lambda$1 will be filled with wavelength $\lambda$2, and vice versa. The wavelengths $\lambda$1 and $\lambda$2 forming beams 18a and 20a, respectively, when projected onto the appropriate photopolymerizable resin, create an image that is then used to make a part. A significant advantage of the system 10 is that no increase in the number of micromirrors of the DMD or other complicating optics are needed to produce the two mirror negative images simultaneously on the photopolymerizable resist.

Figure 5:
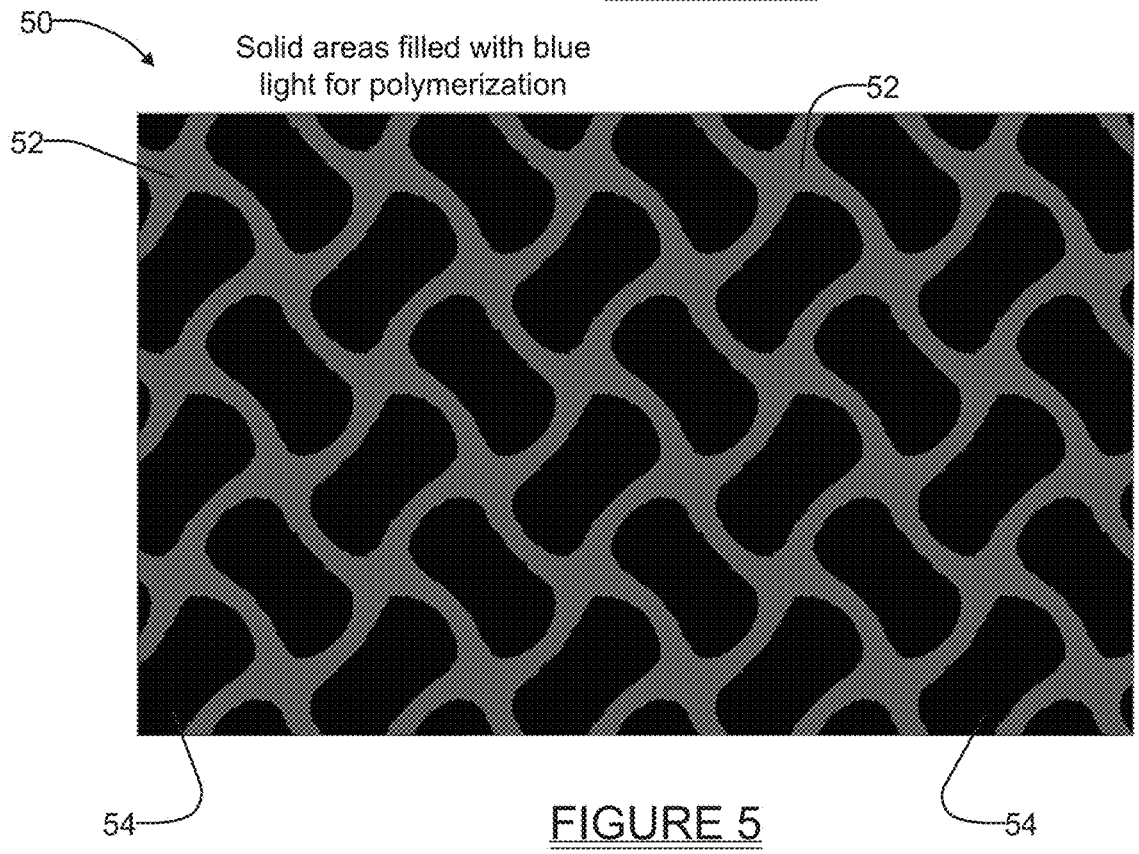
FIG. 5 shows the white areas of FIG. 4 illuminated with a first beam having a first wavelength ($\lambda 1$) that initiates polymerization of the photopolymerizable resist present in the white areas.
Figure 6:
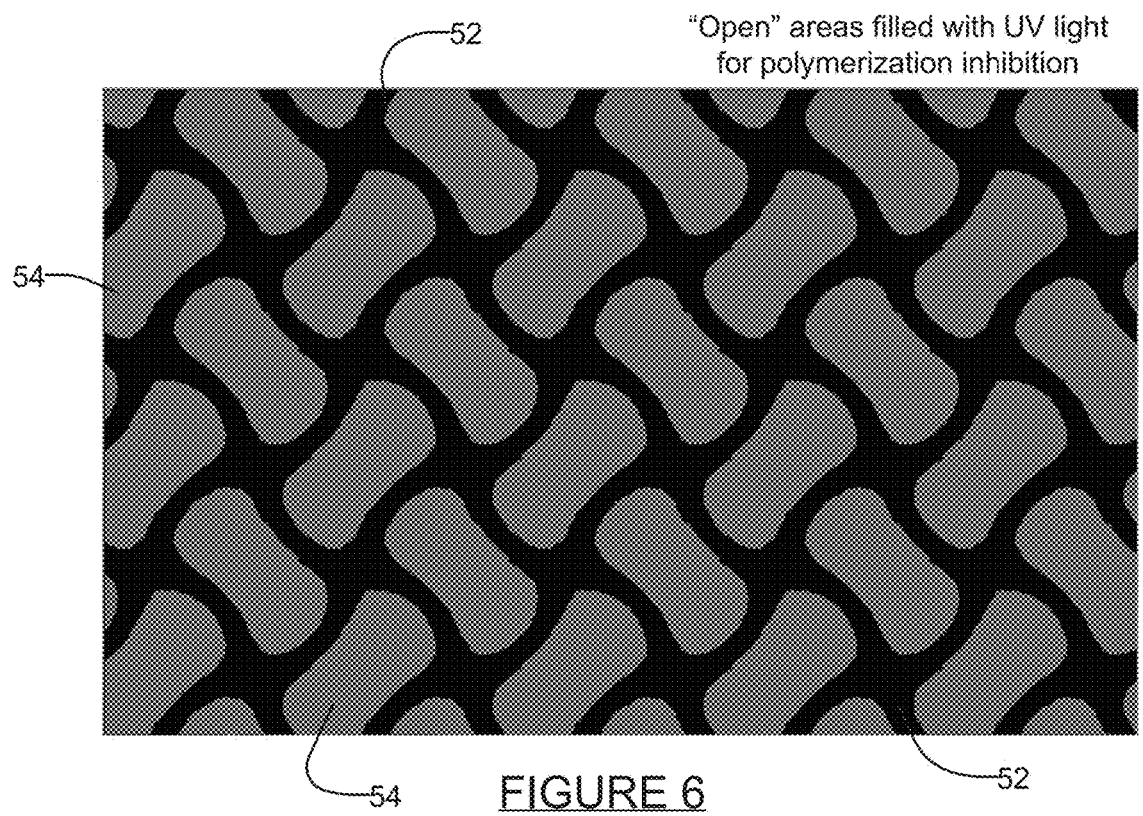
FIG. 6 shows the "open" areas from FIG. 4 filled with the second beam (wavelength $\lambda 2$) that inhibits polymerization of the photopolymerizable resist present in the black areas.

The important feature of the system 10 being able to simultaneously generate beams 18a and 20a, which enable the creation of two simultaneous, interleaved negative images on the photopolymerizable resist, is further illustrated in FIGS. 4-7. FIG. 4 shows an image 50 where the white areas 52 represent areas to be printed and the black areas 54 are areas which are "open" or not being printed. FIG. 5 shows the image 50 with the first beam 18a (polymerizing beam at $\lambda$1) illuminating the white (solid) areas 52. FIG. 6 shows the black (open) areas 54 of FIG. 1 now filled with light from the second beam 20a (e.g., UV light at $\lambda$2), which inhibits polymerization of the photopolymerizable resist in these areas. FIG. 7 shows the Images 1 and 2 resulting on the photopolymerizable resist from the beams 18a and 20a both present, where the "solid" areas are all illuminated by the first beam 18a (for initiating polymerization), and the "open" areas are all illuminated second beam 20a (for inhibiting polymerization). From FIG. 7, in particular, it can be seen that the Images 1 and 2 that result when the beams 18a and 20a fall on the photopolymerizable resist are effectively image negatives of each other.

The intensity of each wavelength beam 18a and 20a ($\lambda$1 and $\lambda$2, respectively) is independently controllable using the electronic controller 14. Controlling the power for each of the beams 18a and 20a enables the user to adjust the ratio of the inhibition-initiation radical generation created by the beams 18a and 20a, for example via the user computer or peripheral 15, to achieve the desired results. Further, each of the first beam 18a ($\lambda$1) and second beam 20a ($\lambda$2) can be used independently if desired, so single wavelength operation using the DMD 12 of the system 10 is not precluded.

The present disclosure is believed to be the first disclosure of the use of a second beam path on the DMD 12 in a DLP-SLA type system. Normally, multiple wavelengths used for projectors such as movies and images are achieved by various methods, either by time multiplexing though a color wheel and a broad wavelength source, or by combining several individual DMD devices together to make a single full color image. All these methods involve some significant additional complexity and require various degrees of precision alignment and synchronization. The system 10 makes the wavelengths synchronous and automatically creates negative images of each other once the wavelengths of light fall on a photopolymerizable resist. This is a significant advantage in additive manufacturing systems, and is ideal for the chemistry of photoinitiator and photoinhibitor dynamics, which enables less than diffraction limited polymerized structures to be produced. The diffraction limit is, a constraint for all forms of photolithography and is a fundamental property for any light-based system. The ability to make structures smaller than the diffraction limit with an otherwise stock DMD, and other readily available components (e.g., lasers, LEDs, lamps, etc.) with the present system 10, is believed to be unique, with the fundamental feature size limit no longer constrained by diffraction (the "diffraction limit" of light which is absolute) but by the photoinitiator and photoinhibitor radical reaction kinetics.

As noted above, the significant drawback of previously developed systems DLP-SLA systems is their inability to produce extremely small holes, grooves or other like features. This is because of the effect that, at small spaces, oxygen is consumed, unwanted scattered light illumination, and diffraction effects, which leads to polymerization reactions in these areas. The present system 10 overcomes this and other manufacturing limitations of conventional DLP-SLA systems and provides an elegant path to producing features far sharper than what is currently achievable with previous DLP-SLA systems, and in fact enables the production of a small feature size that approaches what is currently only possible with Two Photon Lithography. And those skilled in this art will appreciate that Two Photon Lithography systems require expensive femtosecond lasers, as well as expensive high NA microscope objectives.

An undesirable effect from SLA printing is the undercut or scalloping seen in the layers produced. For almost all SLA printing photoabsorbers are added to the resin to limit the depth light penetration into the photo resist to a desired thickness, therefore the depth of polymerization action is limited and controlled. The edge of a layer normally exhibits undercut due to light being absorbed and losing intensity while propagating through the resin. As such the density of photoinitiated free radicals is likewise lowered with no corresponding drop in oxygen molecules that terminate the polymerization reaction. Therefore, as the light goes deeper its photoinitiator free radicals are consumed at a faster rate, thus lowering the polymerization rate, giving rise to undercut. For the photoinitiator and photoinhibitor controlled process implemented by the system 10 using the beams 18a and 20a, respectively, the relative depth of light penetration are independent parameters. These parameters are adjusted by the photoabsorbers added to the resin for the different wavelengths. If to remediate scalloping or layer undercut, the inhibitor light (i.e., the second beam 20a at λ2) fell off in intensity at a faster rate than the initiator light (beam 18a at λ1), for example if the absorption depths were adjusted to be 3:1 (e.g., 30 μm depth of penetration for the photoinitiator and 10μ depth of penetration for the photoinhibitor), the effects could be adjusted. The constraining action of the photoinhibitor would limit the size of the top 10 μm of the layer with the lower 20 um being much less affected by the constraining action, thereby lessening the undercut produced. This should produce a smoother, more continuous sidewall print. Likewise, other layer edge shapes could be generated if desired. This capability is expected to be very useful and valuable for SLA printing.

This shorter depth of light penetration for the photoinhibitor wavelength (beam 20a at λ2) can also address somewhat the issue of Z axis control. The photoinhibitor and photoinitiator control method presented herein enables smaller features and generally higher quality print in the X and Y axes, but generally no obvious improvements in the Z axis or depth of cure for top down open vat printing. However, with the inhibitor photoabsorber (beam 20a at λ2) adjusted so its light penetrates to a shorter depth than the initiator photoabsorber (beam 18a at λ1) are independent parameters which may be adjusted to different values, this may be exploited to obtain shorter Z axis features. As the inhibitor radicals induced by the photoinhibitor beam (beam 20a at λ2) also cause polymerization, but at a much lower rate, they will also cause polymerization and develop features albeit requiring a longer exposure time. When a shorter Z axis feature is needed, for example with a bridge or overhanging features, the inhibitor wavelength (λ2 of beam 20a) can be used alone to generate the needed feature. This action thus would decrease the cure depth and increase the Z axis resolution when needed, and thus provide a method to shorten Z axis features created in the photopolymer resin. This in fact could be exploited to speed up a SLA DLP 3D printing process, in general. Currently for 3D printing, the finest Z axis feature size dictates the step size for all layers, as there is no way to get different light penetration depths as there is only one wavelength present. For example, a part 10 mm tall that had features that required 10 μm layers would require 1000 layers. Printing at thirty seconds a layer would take 8.33 hours. If only 10% of the layers had small Z axis features with the rest of the part being a solid or something with a lower Z resolution, a two-wavelength system whose wavelength absorption depths were adjusted to be 3:1 to remediate scalloping or layer undercut (30 μm photoinitiator, 10 μm photoinhibitor) could also print the part significantly faster. With 30 μm layers being generated with both wavelengths (or the single longer depth of cure wavelength), the layer depth being the photoinitiator wavelength (λ1 of beam 18a), then the shallower Z axis layers could be made with the photoinhibitor radicals only, which penetrate only 10p into the resin. That part would require only 400 layers and might be made in 3.33 hours, which is 250% faster. This would sacrifice the sub diffraction limit feature size ability as it is the ratio of the initiator and inhibitor that enables smaller XY features for these layers, and presumably the photo inhibitor light would need to be on for a longer time for sufficient cure.

Further, these cure depths can be exploited for even more increased speed. The two wavelength beams 18a (λ1) and 20a (λ2) may be used to make parts much faster without considering any XY feature implications. For example, if the depths of cure were adjusted to 10:1, say 100 μm and 10 μm depths, that same part would require only 190 layers and might be made in 1.58 hours, which is 527% faster than being limited to one cure depth of 10 μm. So generally, the two wavelengths could be exploited for different effects, in this case two different depths of cure. This new ability to print significantly faster, via two wavelengths with different cure depths, may in fact be very valuable for commercial applications.

Either of the beam 18a or 18b paths could be made to be multiple wavelengths with the use of beam combining optics and filters. This could be used to adjust various other parameters like multiple depths of focus for different Z axis layers, perhaps layer undercut control, or a combination of wavelengths and flux, to maximize the versatility of the system 10.

With brief reference to FIG. 8, a flowchart 100 illustrating basic operations of the system 10 is shown. The system 10 initially generates the first and second beams 18a and 20a using the light sources 18 and 20, respectively, as indicated at operations 102 and 104. The DMD 12 is then illuminated by both beams 18a and 20a, as indicated at operation 106. At operation 108 the electronic controller 14 may apply control signals to the DMD 12 to generate a pattern, and where the pattern is being illuminated simultaneously by the beams 18a and 20a. The light pattern reflected by the micromirrors 12a, which is used to create the final Images 1 and 2 on the photopolymerizable resist 32, will be negative images of one another with, in this example, Image 1 being made up of light at the first wavelength (λ1) which initiates polymerization, and Image 2 being made up of light at the second wavelength (λ2) which inhibits polymerization.

At operation 110 the projection optics 16 collect the light reflected from the image of the DMD 12, which has light from beams 18a and 20 thereon. At operation 112 the projection optics 16 are produces an image of the DMD 12 onto the photopolymer resist to form a layer of a part. At operation 114 the electronic controller 14 makes a check to determine if the part is complete, and if not, then information to form the next layer may be obtained (i.e., n=n+1) at operation 116, and operations 106-114 repeated. Wavelengths one (λ1) and two (λ2) are blocked via either a shutter mechanism or by removing power to the light source whenever the light is not needed, for example during a substrate "dunk step" (not shown in the flow chart). When the check at operation 114 indicates the part is complete, then all the layers of the part will be complete.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A digital light projector (DLP) system comprising:
   a first light source for generating a first beam at a first wavelength, the first beam operable to cause polymerization of a photopolymerizable resist;
   a second light source for generating a second beam at a second wavelength different from the first wavelength, and where the second beam is operative to inhibit polymerization of the photopolymerizable resist;
   a digital micro mirror device (DMD) having a plurality of micromirrors configured to receive the first and second beams; and
   an electronic controller configured to control the micromirrors of the DMD such that the DMD receives the first and second beams and simultaneously generates therefrom a first light pattern and a second light pattern, the first light pattern, when falling on the photopolymerizable resist, creating a first image made up of light of the first wavelength, and the second light pattern, when falling on the photopolymerizable resist, creating a second image made up of light of the second wavelength, the first and second images being interleaved with one another, and where the first wavelength light causes polymerization of a first portion of the photopolymerizable resist, while the second wavelength light inhibits polymerization of a second portion of the photopolymerizable resist; and
   wherein the first and second light sources are positioned to be offset from one another by an identical angle, in degrees, relative to an axis extending normal to a tilt axis of a micromirror of the plurality of micromirrors of the DMD, to project the first and second beams at the DMD at two different angles relative to the axis; and
   wherein the micromirrors of the DMD are controlled by the electronic controller to simultaneously position each micromirror in either a first position of tilt or a second position of tilt, and when any selected one of the micromirrors is positioned in the first position of tilt, the selected one of the micromirrors receives and reflects only the first beam toward the photopolymerizable resist, and when any selected one of the micromirrors is positioned in the second position of tilt, the selected one of the micromirrors simultaneously receives and reflects only the second beam toward the photopolymerizable resist.

2. The system of claim 1, where a wavelength of the second beam is shorter than a wavelength of the first beam.

3. The system of claim 1, wherein the first light source comprises at least one of: a first LED or a first laser.

4. The system of claim 1, wherein the second light source comprises at least one of: a second LED or a second laser.

5. The system of claim 1, wherein the first image forms a negative of the second image, and vice versa.

6. The system of claim 1, wherein:

when a micromirror of the DMD is in the first position of tilt, the first one of the first and second beams is reflected parallel to the axis extending normal to a chip face of a chip face surface of the DMD and used for initiating polymerization, while the second one of the first and second beams is reflected from the micromirror at an angle non-parallel to the axis extending normal to the DMD chip face surface and not used for polymerization, and is directed outside of a projection optics collection space; and when the micromirror of the DMD is in the second position of tilt, the first beam is reflected at the angle non-parallel to the axis extending normal to the DMD chip face surface and is not able to be used for polymerization and is directed outside of a projection optics collection space, and the second beam is reflected parallel to the axis extending normal to the tilt axis and is used for inhibiting polymerization of the photopolymerizable resist.

7. The system of claim 1, further comprising:

a first alignment and conditioning optics subsystem for receiving and conditioning the first beam; and a second alignment and conditioning optics subsystem for receiving and conditioning the second beam.

8. The system of claim 7, wherein:

the first and second alignment and conditioning optics subsystems are positioned to be offset by an identical but opposite angle, in degrees, relative to an axis extending normal to a tilt axis of one micromirror of the plurality of micromirrors of the DMD.

9. The system of claim 1, further comprising a memory operably associated with the electronic controller and in communication with the electronic controller for storing at least one of information or data pertaining to manufacture of a part using the system.

10. The system of claim 1, wherein the electronic controller is configured to control power levels of the first and second light sources.

11. A three dimensional (3D) printing system for forming a structure from a photopolymer resin, the system comprising:

a first light source for generating a first beam at one of a first wavelength or a first wavelength range, the first beam operable to cause polymerization of a photopolymerizable resist;

a second light source for generating a second beam at one of a second wavelength or a second wavelength range, different from the first wavelength or first wavelength range, and where the second beam is operative to inhibit polymerization of the photopolymerizable resist; and a digital micro mirror device (DMD) having a plurality of micromirrors, each of the micromirrors being tiltable between first and second tilt positions, and each being configured to simultaneously be illuminated by the first and second beams;

an electronic controller configured to control the micromirrors of the DMD to cause the micromirrors to act then acting as switches between either beam for each said micromirror, the DMD, then when imaged by the first and second beams, creates first and second light patterns which form simultaneously created first and second images on the photopolymer resist, and which overlay the first and second images on one another, respectively, where light from the first light pattern is used to make up the first image using the first wavelength and causes polymerization of the photopolymerizable resist, while the light from the second light pattern is used to create the second image on the photopolymer resist and is made up of the second wavelength, and inhibits polymerization of the photopolymerizable resist, and where the first and second images created on the photopolymerizable resist using the first and second light patterns are negative images of one another which are interleaved with one another; and wherein the first and second light sources are positioned to be offset from one another by an identical angle, in degrees, relative to an axis extending normal to a tilt axis of a micromirror of the plurality of micromirrors of the DMD, to project the first and second beams at the DMD at two different angles relative to the axis;

wherein the micromirrors of the DMD are controlled by the electronic controller to position each one of the plurality of micromirrors selectively in either a first position of tilt or a second position of tilt, and:

when a first subplurality of the micromirrors is selectively positioned in the first position of tilt, the first subplurality of micromirrors receives and reflects only the first beam toward the photopolymerizable resist while receiving and reflecting the second beam away from the photopolymerizable resist; and when a second subplurality of the micromirrors is selectively, simultaneously positioned in the second position of tilt, the second subplurality of the micromirrors receives and reflects only the second beam toward the photopolymerizable resist.

12. The system of claim 11, wherein the first and second light sources are positioned offset, by an identical angle in degrees (±24°), relative to an axis extending normal to a face of the DMD and perpendicular to the tilt axis of the micromirrors of the DMD.

13. The system of claim 11, wherein the electronic controller is further configured to control a power level of each one of the first and second light sources.

14. The system of claim 11, further comprising a projection optics for receiving at the light patterns reflected from the DMD and producing the images in the photopolymerizable resist.

* * * * *